J. W. MINDERFER.
GREASE BOX PLUG LOCK.
APPLICATION FILED JAN. 26, 1916.
1,207,596.
Patented Dec. 5, 1916.
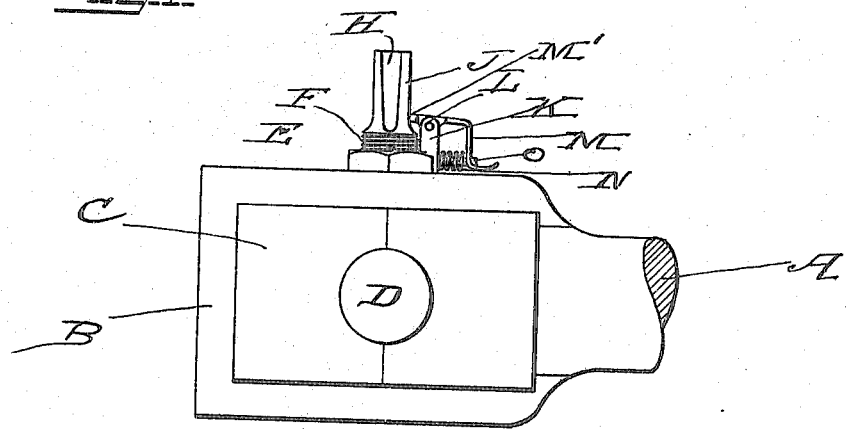
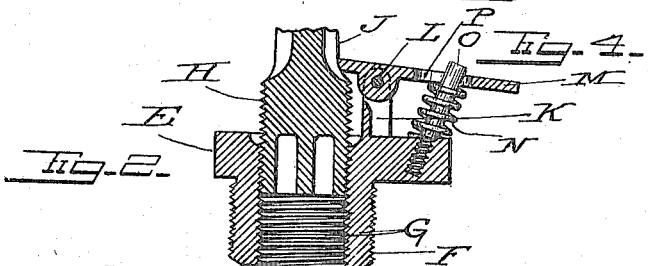
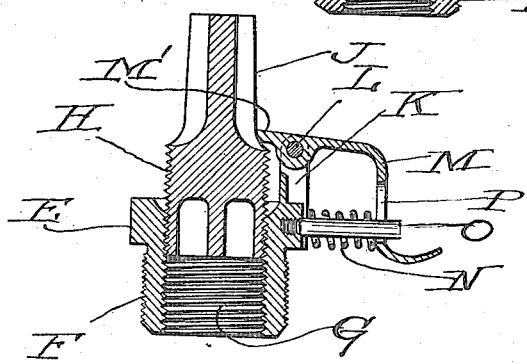
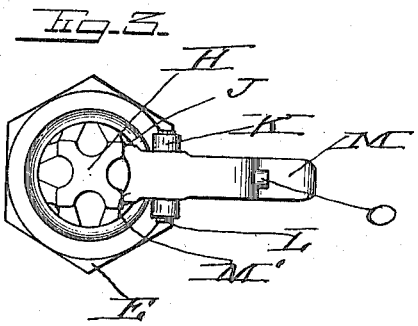

ical equations. # UNITED STATES PATENT OFFICE.

JOHN W. MINDERFER, OF LINCOLN, NEBRASKA.

GREASE-BOX-PLUG LOCK.

1,207,596.

Specification of Letters Patent.

Patented Dec. 5, 1916.

Application filed January 26, 1916. Serial No. 74,334.

*To all whom it may concern:*

Be it known that I, JOHN W. MINDERFER, a citizen of the United States, residing at Lincoln, in the county of Lancaster and State of Nebraska, have invented certain new and useful Improvements in Grease-Box-Plug Locks, of which the following is a specification.

My invention relates to improvements in grease box plug locks and the main object of my invention is the provision of means for locking the screw plug used upon grease boxes employed in connection with piston rods, stuffing boxes, and in fact in connection with any mechanism using such grease boxes and where the plug by reason of constant movement or vibration unscrews and becomes detached.

Another object of my invention is the provision of means for locking the squared end of a grease box plug, such means being of easy application, simple, strong and inexpensive of construction, and which will occupy small space and not interfere with the operation or use of the box or plug.

Another object of my invention is the provision of a grease box plug lock which may be attached to boxes in general use or at the time of manufacture and which will be efficient and practical in every particular.

To attain these objects my invention consists in the combination with a screw socket and its plug having an angular portion of locking means engaging said angular portion to prevent unscrewing of said plug.

The invention further consists of means of the character and for the purposes stated embodying novel features of construction and combination of parts, substantially as disclosed herein.

In order that the construction in detail and the application and operation of my invention may be understood and its many advantages be fully appreciated I have shown in the accompanying drawing a construction embodying my invention.

Figure 1 represents a side view of a piston rod and bearing with my invention applied. Fig. 2 represents a vertical central sectional view of the invention detached and shown on an enlarged scale, Fig. 3 represents a top plan view, Fig. 4 represents a sectional view of a modified form of my invention.

I have shown my improvement in connection with a piston rod A, having a yoke B, confining the bearing C, for the wrist pin D, but would have it understood that I claim the right to use my invention upon any character or construction of machinery where it would operate or perform its function efficiently.

The invention consists of the socket E, having exterior threads F, and interior threads G, which interior threads receive the threaded end H, of the plug which is formed with the upper square or angular end J.

The double threaded socket is formed on one side with a pair of ears K in which is fulcrumed at L, the finger operated lever M, having its inner end M' squared to engage the squared end J, of the plug and held in locking engagement therewith by means of the spring N, coiled around stud O, which is guided and retained in the slot P, in or adjacent to the finger portion of the lever.

From the foregoing description taken in connection with the drawing the operation of my invention will be readily understood and it will be seen that the spring actuated locking lever can be depressed and withdrawn from the path of the screw plug, permitting the insertion of the plug and that as soon as the plug is screwed home the release of the locking lever permits the spring to force it into engagement with the angular end of the plug, locking the plug positively and preventing any movement thereof no matter what the amount of strain, movement, or vibration may be.

It is evident that I provide a device which will prove desirable, efficient and practical and which by reason of its simplicity and small cost should prove a valuable invention.

I claim:—

A grease box plug lock, consisting of a double threaded socket, a pair of spaced ears rising therefrom, a threaded plug engaging the socket and formed with an angular portion, a finger operated lever pivoted in said ears and engaging the angular portion of the plug, an elongated opening in said finger operated lever, a pin secured in said socket and engaging said opening, and a spiral spring coiled around said pin and bearing against said lever.

In testimony whereof I affix my signature in the presence of two witnesses.

JOHN W. MINDERFER.

Witnesses:
HERMAN KOENIG,
JOHN C. A. BOUTHNER.